(12) United States Patent
Schiavo et al.

(10) Patent No.: US 7,722,317 B2
(45) Date of Patent: May 25, 2010

(54) CMC TO METAL ATTACHMENT MECHANISM

(75) Inventors: Anthony L. Schiavo, Oviedo, FL (US); Douglas A. Keller, Oviedo, FL (US); Malberto F. Gonzalez, Orlando, FL (US); David C. Radonovich, Winter Park, FL (US)

(73) Assignee: Siemens Energy, Inc., Orlando, FL (US)

( * ) Notice: Subject to any disclaimer, the term of this patent is extended or adjusted under 35 U.S.C. 154(b) by 682 days.

(21) Appl. No.: 11/698,232

(22) Filed: Jan. 25, 2007

(65) Prior Publication Data

US 2008/0178465 A1 Jul. 31, 2008

(51) Int. Cl.
*F01D 25/26* (2006.01)

(52) U.S. Cl. ............... 415/138; 415/134; 415/173.1; 266/285; 432/239

(58) Field of Classification Search ............... 415/134, 415/136, 138, 173.1, 173.3, 173.4, 232; 266/280, 266/285, 286
See application file for complete search history.

(56) References Cited

U.S. PATENT DOCUMENTS

| | | | |
|---|---|---|---|
| 4,066,384 A | 1/1978 | DiFerdinando | |
| 4,245,954 A | 1/1981 | Glenn | |
| 5,035,573 A | 7/1991 | Tseng et al. | |
| 5,116,199 A | 5/1992 | Ciokajlo | |
| 5,201,847 A | 4/1993 | Whidden | |
| 5,616,001 A | 4/1997 | Boyd | |
| 5,921,749 A | 7/1999 | McLaurin et al. | |
| 6,164,903 A | 12/2000 | Kouris | |
| 6,200,092 B1 | 3/2001 | Koschier | |
| 6,325,593 B1 | 12/2001 | Darkins, Jr. et al. | |
| 6,382,905 B1 * | 5/2002 | Czachor et al. ................ | 415/9 |
| 6,648,597 B1 | 11/2003 | Widrig et al. | |
| 6,709,230 B2 | 3/2004 | Morrison et al. | |
| 6,758,653 B2 | 7/2004 | Morrison | |
| 6,877,952 B2 * | 4/2005 | Wilson ........................ | 415/136 |
| 6,896,484 B2 | 5/2005 | Diakunchak | |
| 7,278,820 B2 * | 10/2007 | Keller ....................... | 415/173.1 |
| 2005/0260034 A1 * | 11/2005 | Arbona ...................... | 403/408.1 |

* cited by examiner

*Primary Examiner*—Edward Look
*Assistant Examiner*—Ryan H Ellis

(57) ABSTRACT

A CMC wall (20F) may be attached to a metal wall (22F) by a plurality of bolts (28A, 28B, 28C) passing through respective holes (24A, 24B, 24C) in the CMC wall (20F) and holes in the metal wall (22F), clamping the walls (20F, 22F) together with a force that allows sliding thermal expansion but does not allow vibrational shifting. Distal ones of the holes (24A, 24B) in the CMC wall (20F) or in the metal wall (22F) are elongated toward a central one of the bolts (24C) or at alternate angles to guide differential thermal expansion (20T) of the CMC wall (20F) versus the metal wall (22F) between desired cold and hot geometries. A second CMC wall (20R) may be mounted similarly to a second metal wall (22R) by pins (39A, 39B, 39C) that allow expansion of the CMC component (201) in a direction normal to the walls (20F, 20R).

15 Claims, 5 Drawing Sheets

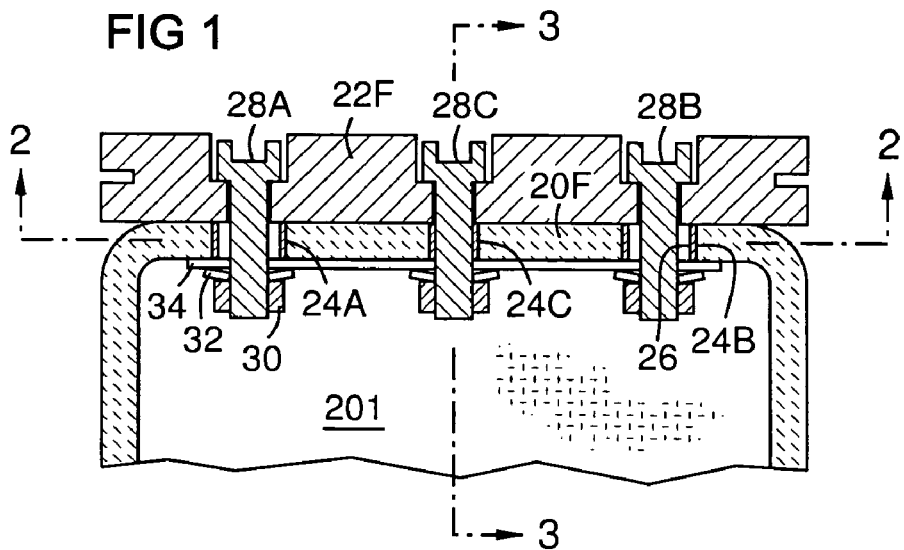
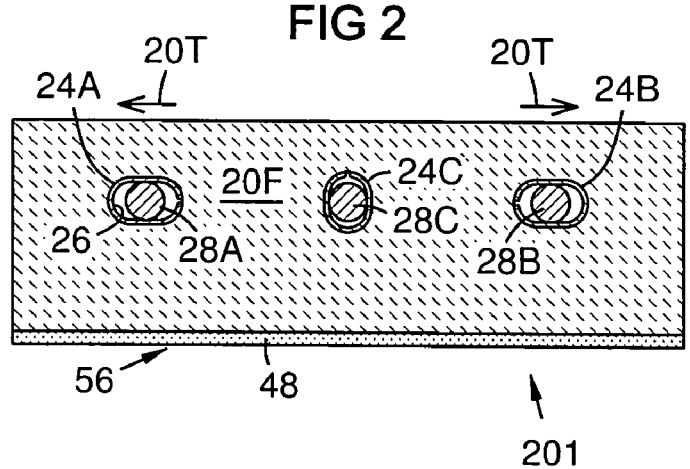
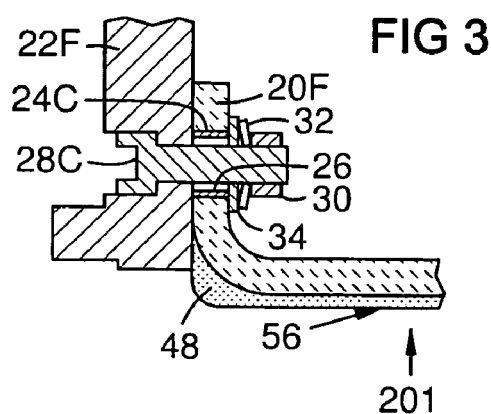

CMC TO METAL ATTACHMENT MECHANISM

FIELD OF THE INVENTION

The invention relates to mechanisms for attaching low alpha ceramic components to high alpha metal support structures in high temperature, dynamic environment, in particular in industrial and aero gas turbines.

BACKGROUND OF THE INVENTION

Ceramic matrix composites (CMCs) have a higher temperature capability than metallic alloys, making them potentially very valuable for implementation into gas turbines, which can run at temperatures well in excess of metal capabilities. Metal is stronger and more ductile, making it better for supporting hardware, such as vane carriers, casings, bolting, etc. To combine the advantages of these two materials, at some point they must attach to one another. However, attaching low alpha (low thermal growth) CMCs to higher alpha metals is not a simple procedure. In dynamic environments, the CMC and metal need to be rigidly attached to prevent vibration, which may lead to wear and/or fatigue issues. But, if high temperatures are also present, the metal and CMC will grow at different rates. If they are rigidly attached, the metal, being stiffer and stronger, will take the CMC with it. CMC is by nature more brittle and less strain-tolerant than metal. Such movement could damage, or even destroy, the CMC. The trick is to design an attachment that satisfies both these concerns—vibration and thermal growth.

In addition, in curved structures, any thermal gradient will cause the metal and CMC to not just linearly grow, but also curl or uncurl, depending on the thermal gradient characteristics. The attachment must therefore allow for such curling, and even take advantage of it.

There are also cases where the CMC structure is large enough, or carries enough load, that it requires multiple attachment regions but is still one structure. A second attachment region must allow for thermal growth of a CMC part away from a first attachment region, in addition to the metal it is attached to. This invention is a solution to these design considerations.

BRIEF DESCRIPTION OF THE DRAWINGS

The invention is explained in the following description in view of the drawings that show:

FIG. 1 is a sectional view of a metal to CMC attachment.

FIG. 2 is a sectional view taken along line 2-2 of FIG. 1.

FIG. 3 is a sectional view taken along line 3-3 of FIG. 1.

DETAILED DESCRIPTION OF THE INVENTION

Figure 4:
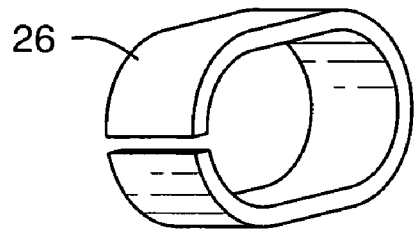
FIG. 4 is a perspective view of a slotted spring pin for an elongated bolt hole.

The first design consideration in the attachment of a CMC component to a metal component in a dynamic, high temperature environment is how to clamp the CMC hard enough against the metal to prevent relative vibratory motion while still allowing for the two components to grow different amounts due to temperature changes. FIG. 1 shows such a solution. A CMC component 201 has a wall 20F that is mounted against a metal wall 22F by three bolts 28A, 28B, and 28C. A nut 30 on each of the bolts 28A, 28B, 28C clamps the CMC wall 20F against the metal wall 22F with a retaining force in a range between a lower limit below which sliding is present between the CMC wall 20F and the metal wall 22F due to operational vibrations in the CMC and metal components 201, 22F, and an upper limit above which it prevents relative sliding of the walls 20F, 22F due to differential thermal expansion or above which it exceeds a stress limit in the CMC wall 20F, the range being non-inclusive of the upper and lower limits. As the structures heat up, the bolts 28A, 28B, 28C elongate more than the CMC wall 20F thickens. Therefore, a spring washer 32 may be used to maintain load between the CMC wall 20F and metal wall 22F as the bolts elongate. Also, in each of the holes 24A, 24B, 24C in the CMC wall, either a wear coating or a spring pin 26 can be used to prevent wear of the CMC. A metal washer plate 34 may be provided to distribute clamping stress on the CMC wall 20F, and to provide a sliding surface between the spring washers 32 and the CMC.

Three bolts 28A, 28B, 28C are shown for a reason. In either the CMC wall 20F or the metal wall 22F, the bolt holes can be elongated to allow for the thermal growth mismatch. For example, as shown in FIG. 2, the central CMC hole 24C can be elongated in a vertical direction to position the CMC wall 20F about that center point. The distal holes 24A, 24B can be elongated in a horizontal direction to allow the metal to grow relative to the CMC in that direction or to allow the CMC to grow relative to the metal, depending on thermal gradients. Relative thermal growth is indicated by arrows 20T. The arrangement of these elongations can be changed to allow a component to grow from one side instead of out from the center. A CMC component may have a surface 56 exposed to hot combustion gasses, and this surface may be coated with a refractory insulating layer 48 as known in the art.

Figure 5:
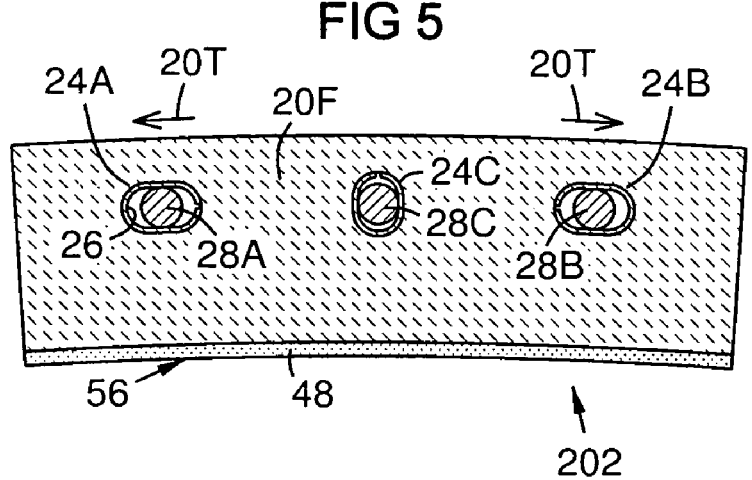
FIG. 5 is a sectional view as in FIG. 2 of a curved CMC component.
Figure 6:
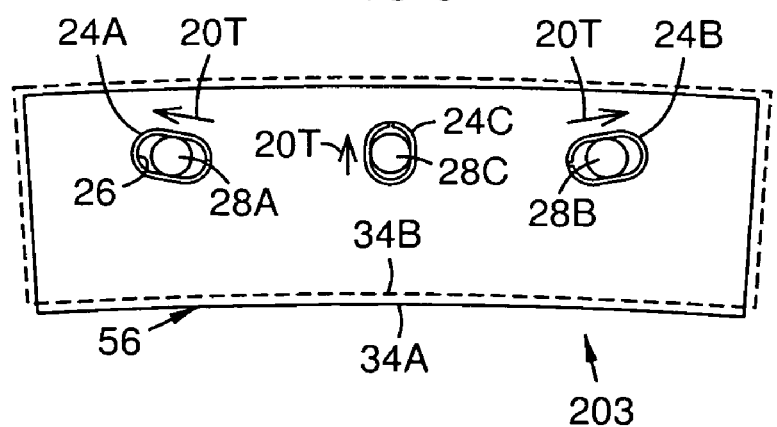
FIG. 6 shows expansion geometry of a curved CMC component with alternate angles of the distal bolt holes.

If the CMC component is a curved structure 202 as seen in FIG. 5 or if there is a thermal gradient through the CMC component, it may flatten out or curl even more, depending on the gradient and geometry. As shown in FIG. 6, a curved CMC component 203 may have distal holes 24A, 24B elongated at modified angles to allow for this distortion so that additional strain is not imparted to the CMC. Depending on the arrangement of the angled holes 24A, 24B, and the curling or flattening of the component 203, the CMC can be allowed to shift in space outward or inward with respect to the center of its radius of curvature, as shown by alternate positions 34A, 34B.

Figure 7:
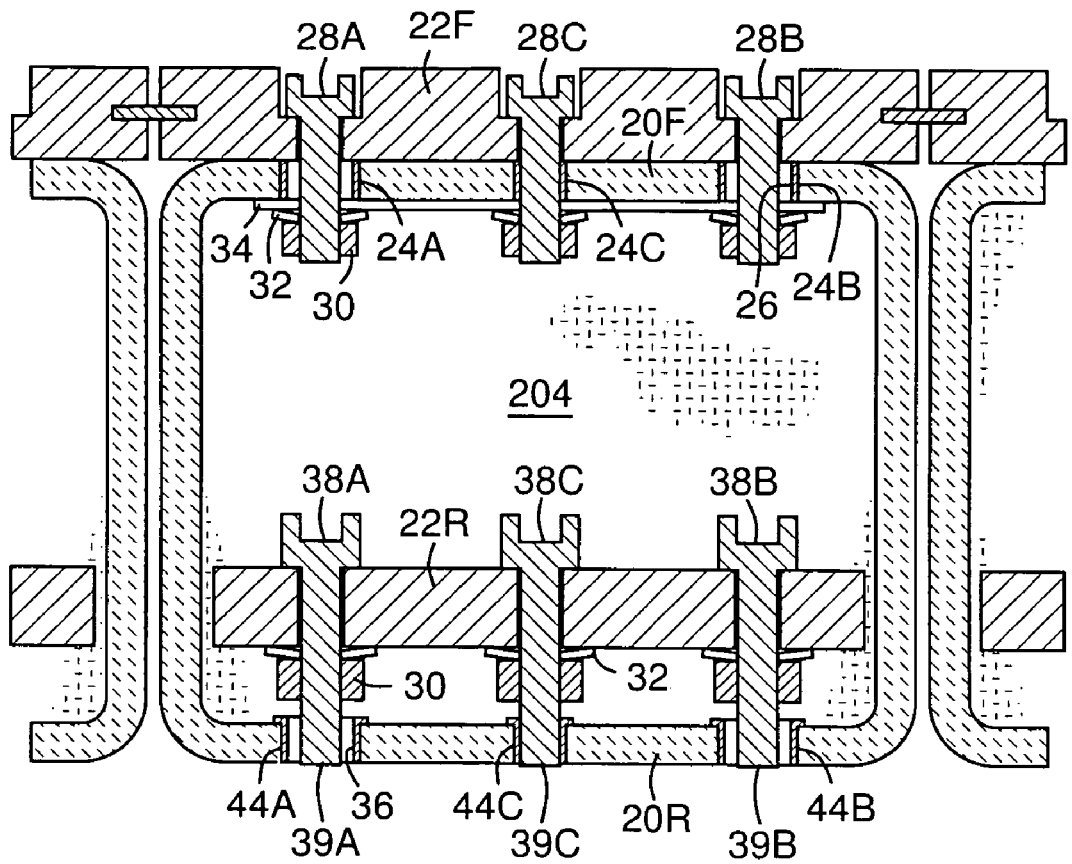
FIG. 7 is a sectional view of a turbine shroud ring segment using embodiments of the present attachment concept on both front and back walls.

The CMC component may require more than one attachment area, for example front and back attachment areas as shown for a CMC ring segment 204 in FIG. 7 due to size, loading, geometry, etc. In this case, the attachment mechanism of the second area will differ from that of the first area. The main difference is that these new points must allow for the thermal growth of the CMC component 204, which means they can't be rigidly attached, but must have some sort of sliding joint, as seen in a second CMC wall 20R of FIG. 7.

Here, a second set of bolts 38A, 38B, 38C, can be attached to either the second CMC wall 20R or to a second metal wall 22R using nuts 30 and spring washers 32. These second bolts have pin ends 39A, 39B, 39C, that can slide through the other component. The holes 44A, 44B, 44C for the pin ends 39A, 39B, 39C, will need to be elongated in these additional attachment points similarly to the holes 24A, 24B, and 24C of the first attachment points to allow for thermal growth and curling or flattening. The holes 44A, 44B, 44C in the CMC may be lined with spring pins 36. Note that the spring pins and bolt pin ends are illustrated herein as having a round cross-sectional shape; however, other cross-sectional shapes such as elliptical, for example, may be used in other applications.

Figure 9:
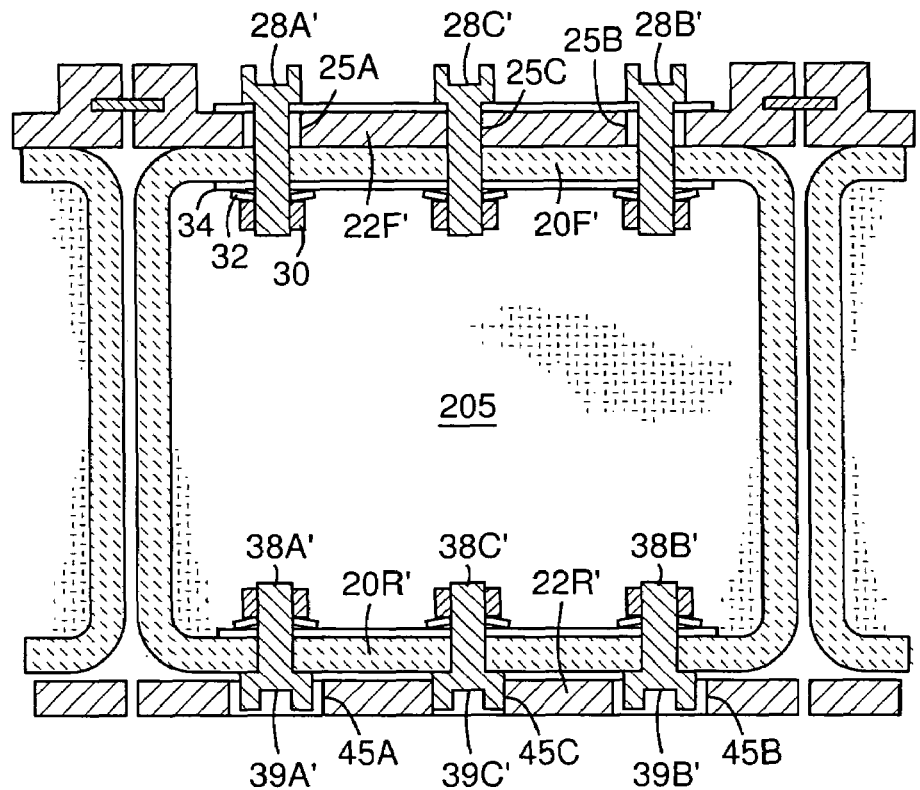
FIG. 9 is a sectional view as in FIG. 7 showing additional design options for bolts and expansion holes.
Figure 10:
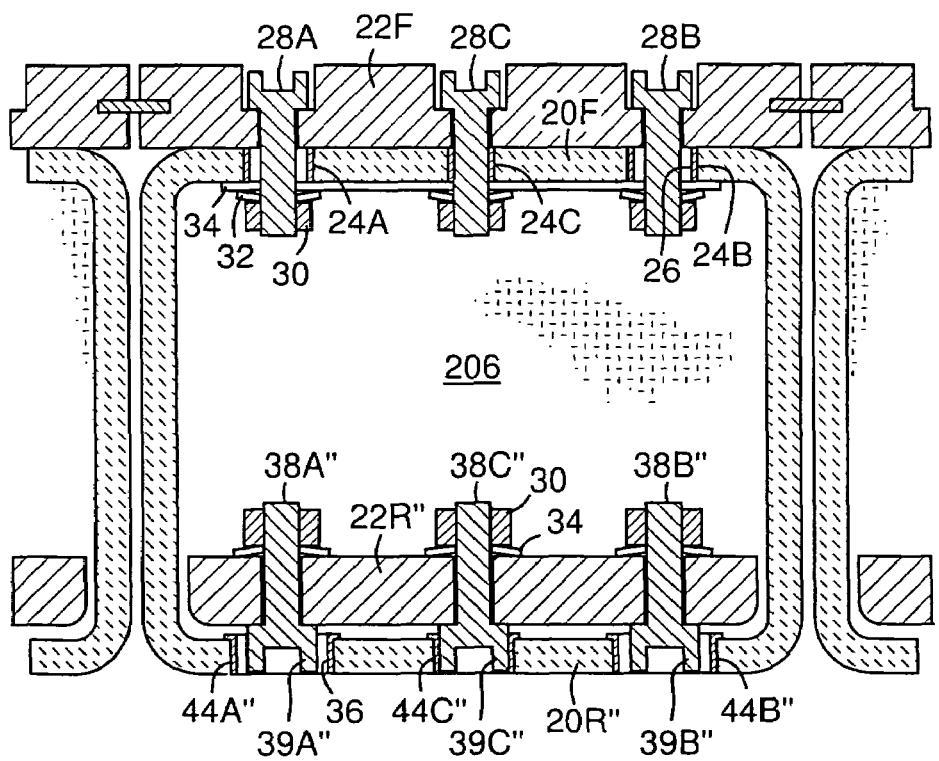
FIG. 10 shows a variation of FIG. 7 in which the back bolts are turned around.

An example of the present invention being used is in the case of a ring segment for a gas turbine. A ring segment is shown in various versions 204, 205, and 206 in FIGS. 7-10. In FIGS. 7, 9, and 10 it is shown mounted between adjacent ring segments partially shown. A ring segment is a curved component about the center of the engine. An entire row of these ring segments form a ring around the rotating blades. It utilizes the initial attachment description for a first wall 20F per FIGS. 1-6 as applied to a curved component 202 or 203. Ring segments carry a large pressure load. Therefore a downstream attachment wall 20R is required, utilizing the additional attachment scheme with pin ends 39A, 39B, 39C in holes 44A, 44B, 44C.

Figure 8:
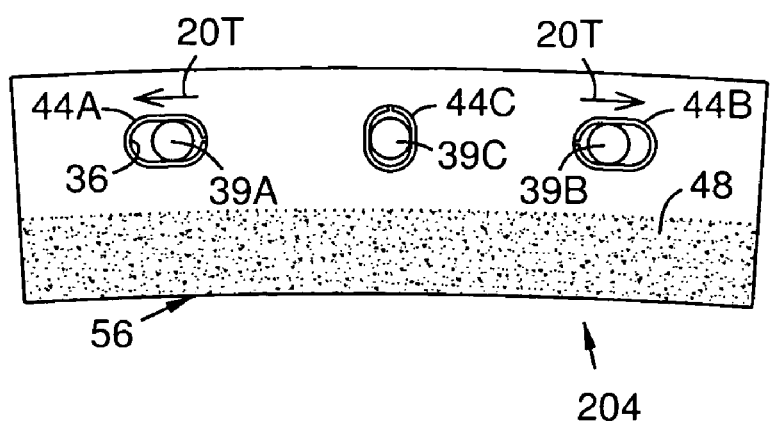
FIG. 8 is a back view of a ring segment of FIG. 7.

FIG. 8 shows a back view of a downstream wall 20R of a ring segment 204. The elongated distal holes 24A, 24B in the first CMC wall 20F, and the elongated distal holes 44A, 44B in the second CMC wall 20R can be elongated in directions that guide the ring segment from a first relatively cool operational geometry to a second relatively hot operational geometry 34A, 34B as in FIG. 6, while maintaining a generally constant clearance between an inner surface 56 of the CMC component and a turbine blade tip.

FIG. 9 shows an alternate ring segment 205 in which a first set of bolts 28A', 28B', 28C' clamp a front CMC wall 20F' against a front metal wall 22F'. The front metal wall 22F' in this embodiment has elongated bolt holes 25A, 25B, 25C. A second set of bolts 38A', 38B', 38C' are fastened onto a back CMC wall 20R', and the heads of these bolts serve as pins 39A', 39B', 39C' in elongated holes 45A, 45B, 45C in a back metal wall 22R'. Other modifications are possible. For example, the back metal wall 22R' may be disposed forward of the back CMC wall 20R', and the back bolts 38A', 38B', 38C' may be turned around accordingly.

FIG. 10 shows an alternate embodiment of a ring segment 206 based on a modification of FIG. 7, in which the back bolts 38A", 38B", 38C" are turned around by comparison to those of FIG. 7, and have heads that also serve as pins 39A", 39B", 39C" in pin holes 44A", 44B", 44C" in the back CMC wall 20R" of the modified ring segment 206. This modification allows the back bolts 38A", 38B", 38C" to be shorter than those of FIG. 7, and allows the back metal wall 22R" to be closer to the back CMC wall 20R".

Central holes of the present attachment mechanism, such as 24C and 44C may be circular or they may be elongated in a direction normal to a line drawn between the respective distal holes 24A-24B or 44A-44B. In the case of a ring segment, this central hole elongation will be along a radius from the turbine axis. Such elongation allows the ring segment to flatten as it expands. It can flatten when the radially inner surface 56 the ring segment heats faster and becomes hotter than the outer portions of the segment. Either a circular or radially elongated shape of the central hole 24C, 44C, maintains the ring segment centered about a circumferential position.

The present CMC-to-Metal attachment mechanism allows the use of longer ring segments because longer expansion geometries can be controlled. This can reduce the number of parts in a gas turbine, reducing manufacturing expense and maintenance, and increasing reliability. Additional bolts (not shown) and respective elongated bolt holes (not shown) may be added between a given central bolt such as 28C and respective distal bolts such as 28A, 28B. The elongations of such intermediate bolt holes may be the same as the elongations of the distal bolt holes 24A, 24B, or less, according to intermediate relative expansion vectors.

Figure 11:
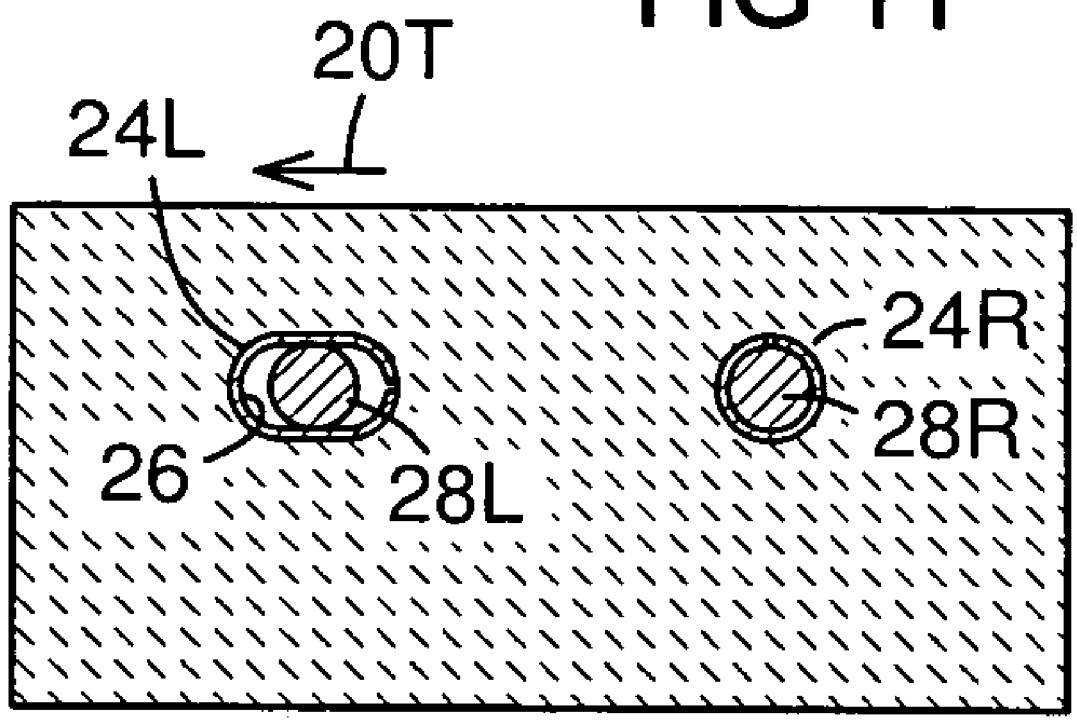
FIG. 11 shows a geometry of the invention that expands to one side.

FIG. 11 shows a geometry 207 with left and right bolts 28L, 28R, left and right holes 24L, 24R, in which the left hole 24L is elongated, and the right hole 24R is circular. This embodiment expands toward the left.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A CMC-to-metal attachment mechanism, comprising:
   a first CMC wall on a CMC component;
   a first metal wall on a metal component;
   a first plurality of bolts attaching the first CMC wall to the first metal wall; and
   a nut on each of the first plurality of bolts that clamp the first CMC wall against the first metal wall with a retaining force in a range between a lower limit that is a minimum force that prevents sliding of the first CMC wall against the first metal wall due to dynamic stresses in the CMC and metal components, and an upper limit that is the lesser of 1) a minimum force that prevents sliding of the first CMC wall against the first metal wall due to differential thermal expansion of the first CMC wall versus the first metal wall and 2) a minimum force that exceeds a stress limit in the CMC wall, the range being non-inclusive of the upper and lower limits;
   whereby a differential thermal expansion or contraction of the first CMC wall in relation to the first metal wall causes a controllably retained sliding movement of the first CMC wall against the first metal wall without binding, but dynamic stresses in the metal and CMC components do not cause sliding movement of the first CMC wall against the first metal wall.

2. A CMC-to-metal attachment mechanism as in claim 1, wherein the first CMC wall comprises a respective plurality of holes receiving the first plurality of bolts, and each of the plurality of holes in the CMC wall is lined by a spring pin or wear coating.

3. A CMC-to-metal attachment mechanism as in claim 1, wherein the first plurality of bolts comprises a first central bolt and two distal bolts passing through a respective central hole and two distal holes in the first CMC wall, and through a respective central hole and two distal holes in the first metal wall; and wherein each of the two distal holes in either the first CMC wall or the first metal wall are elongated generally along a respective line from the first central bolt to each of the elongated distal holes in either the first CMC wall or the first metal wall.

4. A CMC-to-metal attachment mechanism as in claim 1, further comprising:
   a second CMC wall on the CMC component generally parallel to the first CMC wall;
   a second metal wall on the metal component;

a second plurality of bolts passing through a respective plurality of holes in the second metal wall, each of the second bolts comprising a head end and a pin end; and a nut on each of the second plurality of bolts fixing the second plurality of bolts to the second metal wall, with the pin ends thereof received slidably into a respective plurality of holes in the second CMC wall.

5. A CMC-to-metal attachment mechanism as in claim 4, wherein the second plurality of bolts comprises a second central bolt and a two second distal bolts passing through a respective central hole and two distal holes in the second metal wall;

the pin ends of the second bolts are received slidably into a respective central hole and two distal holes in the second CMC wall; and wherein the two distal holes in the second CMC wall are elongated generally along a respective line from the second central bolt to the two distal holes in the second CMC wall;

whereby a differential thermal expansion of the CMC component in relation to the metal component causes movement of the second CMC wall along a plane of the second CMC wall relative to the second metal wall without binding, and further causes movement of the second CMC wall relative to the second metal wall in a direction normal to the plane of the second CMC wall, guided by the pin ends.

6. A CMC-to-metal attachment mechanism as in claim 5, wherein the holes in the second CMC wall are lined by a spring pin or a wear coating.

7. A CMC-to-metal attachment mechanism as in claim 5, wherein the CMC component is an arcuate segment of a turbine shroud ring, the central hole in either the first CMC wall or the first metal wall is elongated radially, and the central hole in the second CMC wall is elongated radially, whereby thermal expansion of the CMC component causes flattening of the arcuate segment without binding to a desired geometry in an operating turbine engine.

8. A CMC-to-metal attachment mechanism as in claim 5, wherein the elongated distal holes in either the first CMC wall or the first metal wall, and the elongated distal holes in the second CMC wall, are elongated generally along respective circumferential tangent lines.

9. A CMC-to-metal attachment mechanism as in claim 5, wherein the elongated distal holes in either the first CMC wall or the first metal wall, and the elongated distal holes in the second CMC wall, are elongated in respective directions that guide the CMC component from a first relatively cool operational geometry to a second relatively hot operational geometry relative to the metal component.

10. A CMC-to-metal attachment mechanism as in claim 5, wherein the elongated distal holes in either the first CMC wall or the first metal wall, and the elongated distal holes in the second CMC wall, are elongated in directions that guide the CMC component from a first relatively cool operational geometry to a second relatively hot operational geometry, while maintaining a generally constant clearance between an inner surface of the CMC component and a turbine blade tip.

11. A CMC-to-metal attachment mechanism as in claim 10, wherein elongation shapes and directions of the elongated distal holes are based on expansion characteristics of turbine components.

12. A CMC-to-metal attachment mechanism as in claim 5, wherein the head end of the second central and second distal bolts also serves as the pin end thereof.

13. A CMC-to-metal attachment mechanism as in claim 1, wherein the first plurality of bolts comprise first and second bolts that are received in respective first and second bolt holes in the first CMC wall and in respective first and second bolt holes in the first metal wall, and wherein the first bolt hole in the CMC wall and in the first metal wall is circular and the second bolt hole in either the first CMC wall or in the first metal wall is elongated generally along a line between the first and second bolts.

14. A CMC-to-metal attachment mechanism, comprising:
a first CMC wall on a CMC component;
a first metal wall on a metal component;
a first central bolt and a first two distal bolts passing through a respective central hole and two distal holes in the first CMC wall, and through a respective central hole and two distal holes in the first metal wall;
a nut on each of the first bolts that clamps the first CMC wall against the first metal wall with a retaining force in a range between a lower limit that is a minimum force that prevents sliding of the first CMC wall against the first metal wall due to operational vibrations in the CMC and metal components, and an upper limit that is the lesser of 1) a minimum force that prevents sliding of the first CMC wall against the first metal wall due to differential thermal expansion of the first CMC wall versus the first metal wall and 2) a minimum force that exceeds a stress limit in the CMC wall, the range non-inclusive of the upper and lower limits;
the two distal holes in the first CMC wall elongated generally along a respective line from the first central bolt to the respective distal hole in the first CMC wall, and are lined with respective slotted metal spring pins or a wear coating;
a second CMC wall on the CMC component generally parallel to the first CMC wall;
a second metal wall on the metal component;
a second central bolt and a second two distal bolts passing through a respective central hole and two distal holes in the second metal wall, each of the second bolts comprising a head end and a pin end;
a nut on each of the second bolts fixing the second bolts to the second metal wall with the pin ends received slidably into a respective central hole and two distal holes in the second CMC wall; and
the two distal holes in the second CMC wall elongated generally along a respective line from the second central bolt and lined with respective slotted metal spring pins or a wear coating;
whereby a differential thermal expansion or contraction of the CMC component in relation to the metal component causes movement of the second CMC wall along a plane of the second CMC wall relative to the second metal wall without binding, and further causes movement of the second CMC wall relative to the second metal wall in a direction normal to the plane of the second CMC wall, guided by the pin ends.

15. A CMC-to-metal attachment mechanism, comprising:
a first CMC wall on a CMC component;
a first metal wall on a metal component;
a first central bolt and a first two distal bolts passing through a respective central hole and two distal holes in the first CMC wall, and through a respective central hole and two distal holes in the first metal wall;
a nut on each of the first bolts that clamps the first CMC wall against the first metal wall with a retaining force in a range between a lower limit that is a minimum force that prevents sliding of the first CMC wall against the first metal wall due to operational vibrations in the CMC and metal components, and an upper limit that is the lesser of 1) a minimum force that prevents sliding of the first CMC wall against the first metal wall due to differential thermal expansion of the first CMC wall versus the first metal wall and 2) a minimum force that exceeds a stress limit in the CMC wall, the range non-inclusive of the upper and lower limits;

the two distal holes in the first metal wall elongated generally along a respective line from the first central bolt to the respective distal hole in the first metal wall;

a second CMC wall on the CMC component generally parallel to the first CMC wall;

a second metal wall on the metal component;

a second central bolt and a second two distal bolts passing through a respective central hole and two distal holes in the second CMC wall, each of the second bolts comprising a head end that also serves as a pin;

a nut on each of the second bolts fixing the second bolts to the second CMC wall with the pins received slidably into a respective central hole and two distal holes in the second metal wall; and the two distal holes in the second metal wall elongated generally along a respective line from the second central bolt;

whereby a differential thermal expansion or contraction of the CMC component in relation to the metal component causes movement of the second CMC wall along a plane of the second CMC wall relative to the second metal wall without binding, and further causes movement of the second CMC wall relative to the second metal wall in a direction normal to the plane of the second CMC wall, guided by the pin ends.

* * * * *